Nov. 24, 1970  R. A. BOONE ET AL  3,542,995
MEASUREMENT AND CONTROL OF FOCUS IN ELECTRON BEAM WELDING
Filed June 3, 1969

FC-FOCUS CURRENT, D.C. AMPERES
A- AMPLITUDE, CENTIMETERS
f - FREQUENCY, RELATIVE

INVENTORS.
Robert A. Boone
BY Paul Cortland

ATTORNEY.

United States Patent Office 3,542,995
Patented Nov. 24, 1970

3,542,995
MEASUREMENT AND CONTROL OF FOCUS IN ELECTRON BEAM WELDING
Robert A. Boone, Columbus, and Paul Cortland, Cincinnati, Ohio, assignors to the United States of America as represented by the United States Atomic Energy Commission
Filed June 3, 1969, Ser. No. 829,955
Int. Cl. B23k 15/00
U.S. Cl. 219—121                                          4 Claims

ABSTRACT OF THE DISCLOSURE

A system is provided for focusing an electron welding beam on a workpiece. Focusing is controlled by monitoring the output from an electro-mechanical transducer mounted to sense the vibrations set up in the workpiece by the impact of the electron beam striking the workpiece. When the focal point of the beam is directed at the surface of the workpiece the output signal from the transducer has a distinctive low amplitude and high frequency.

BACKGROUND OF THE INVENTION

The invention described herein was made in the course of, or under, a contract with the U.S. Atomic Energy Commission.

The present invention relates to welding of metals by means of an electron beam and more specifically to a system for rapidly and accurately determining when the electron beam is focused on the workpiece being welded.

During the past few years electron beam welding has come into widespread industrial use. Electron beam welding is a fusion process utilizing the heat provided by the degredation of the kinetic energy of a beam of rapidly moving electrons. A typical system for such welding includes a power source, an electron gun, equipment for focusing the electron beam, a work chamber, means for evacuating the chamber, and means for moving the workpiece relative to the beam. Electron beam welding is favored for many industrial applications because (a) the welded workpiece is free of slag and atmospheric contamination; (b) the electron beam can be made very narrow; (c) good welds can be obtained with an unusually low heat input; (d) deep penetration can be obtained (several inches in light alloys); (e) welding speeds are high; (f) both thin and comparatively thick workpieces can be welded with the same machine; and (g) it causes the least distortion of any welding process. Manufacturers recently have increased the utility of electron beam welders by modifying them for use either at intermediate vacuum or at atmospheric pressure.

One of the limitations of electron beam welding is that a specialist is required to operate the equipment. For example, the focal point of the electron beam must be known and must be related to the surface of the workpiece. Hitherto, focusing has been accomplished by observing the surface of the workpiece and manually adjusting the focusing current until the area of impact (a bright spot) is made as small as possible. Thus, the adjustment is dependent on the visual acuity and skill of the operator. Moreover, during welding it is difficult to determine whether the beam focus is still in the same position relative to the workpiece surface. A change in any one of several operating conditions can cause a distance change. For example, a distance change can result when the workpiece is warped.

SUMMARY OF THE INVENTION

This invention is based on a discovery made by the inventors during an investigation of "spiking" (abrupt changes in beam penetration) which was encountered during partial penetration electron beam welding of sandwiched metals. Briefly, the inventors have found that the degree of focus of the electron beam is reflected in the waveform of the output from an electro-mechanical transducer mounted to sense the vibrations set up in the workpiece by the electron beam.

Therefore, it is a primary object of the present invention to provide a system for accurately determining the degree of focus of an electron welding beam on a reference surface or on the surface of the workpiece being welded.

Another object is to provide a system for continually monitoring the focus of an electron welding beam and to provide an electrical signal which may be used to correct the focus.

Yet another object is to provide a system having an electro-mechanical transducer to sense the optimum focusing of an electron beam at the surface of the workpiece being welded.

Other objects and many of the attendant advantages of the present invention will become evident from the following description when taken in conjunction with the accompanying drawings.

DETAILED DESCRIPTION OF THE PREFERRED EMBODIMENT

Figure 1:
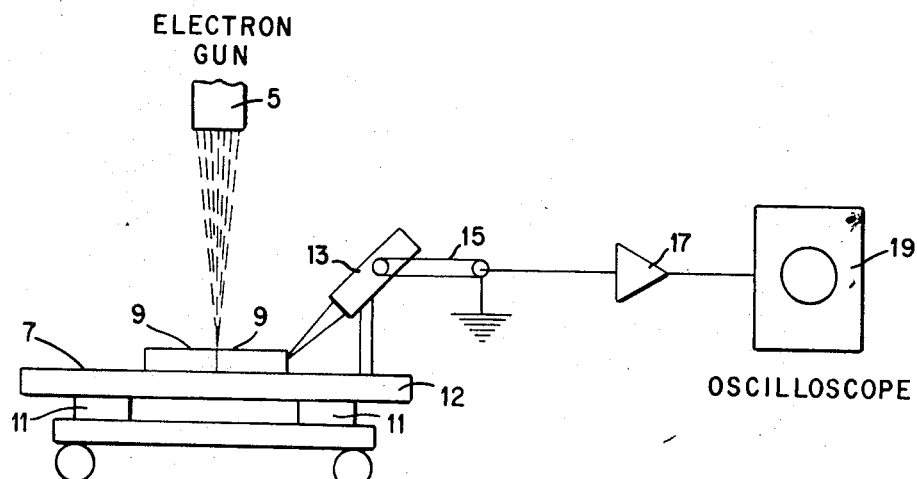
FIG. 1 is a schematic diagram of an electron beam focus measurement system according to the present invention.

The present invention is diagrammatically illustrated in FIG. 1 wherein an electron gun 5 is supported above a support table 7 on which workpieces 9 are placed to be welded. The support table 7 is mounted on shock absorbers 11, such as resilient wafers, or the like, to isolate the workpiece from external sources of viration. The shock absorbers 11 are mounted on a movable fixture 12 so that the workpiece can be moved relative to the beam. An electro-mechanical transducer, for example, a phonograph cartridge 13, is mounted so as to sense vibrations of the workpiece caused by the bombardment of the electron beam from gun 5. Since the needle of cartridge 13 is designed to move laterally it is positioned with its side in contact with the workpiece 9. The cartridge or the workpiece may be adjustably mounted so as to permit adjustment of the position of the cartridge relative to the workpiece. In the particular system shown, the welding is conducted in a conventional vacuum chamber (not shown) under a hard vacuum and the cartridge must be capable of operating under this condition. The output signal from the cartridge 13 is fed through a shielded cable 15 to the input of a preamplifier 17 whose output in turn is fed to an oscilloscope 19, or similar amplitude and frequency measurement device.

To establish an accurate focus of the electron beam on the surface of the workpiece or reference surface indicating the position of focus that a particular weld is to be made, the focus is established on the surface and moved a set distance above or below the surface, the amount and direction depending on the weld joint configuration. For example, the upper surface of workpieces 9 (FIG 1) are to be welded along the abutting edges, therefore, the gun is positioned over the area to be welded at a position where the beam is focused above the area. At this position the oscilloscope will display a rather strong, low frequency signal as compared to that of the in-focus position where the beam is focused at the surface of the workpiece. As the focal point of the electron beam is moved toward the workpiece surface by adjusting the focus current, the amplitude of the signal from the cartridge 13 displayed on oscillosocope 19 will decrease substantially while the frequency increases. At the position of the lowest amplitude and highest frequency it has been found that the beam is "in-focus," that is, its focal point is at the surface of the workpiece. Further, if the focal point is moved further inward of the workpiece from its surface the output signal frequency decreases as the amplitude again increases as in the case where the beam is focused above the surface of the workpiece.

Example

Using the system in FIG. 1, four sets of electron beam-welding experiments were conducted under the conditions outlined in the table on a workpiece of AISI Type 410 stainless plate steel.

TABLE

| Test | Focal point location | Focus current, amp. D.C. | Beam, kv. | Beam, ma. | Oscilloscope scales | |
|---|---|---|---|---|---|---|
| | | | | | x Msec./cm. | y V./cm. |
| A-1 | Above | .70 | 84 | 7.5 | 5 | .05 |
| B-1 | Surface | .50 | 84 | 7.5 | 2 | .05 |
| C-1 | Below | .35 | 84 | 7.5 | 5 | .05 |
| A-2 | Above | .68 | 90 | 1 | 10 | .05 |
| B-2 | Surface | .57 | 90 | 1 | 10 | .05 |
| C-2 | Below | .49 | 90 | 1 | 10 | .05 |
| A-3 | Above | .90 | 115 | 9.5 | 5 | .15 |
| B-3 | Surface | .60 | 115 | 7.5 | 10 | .05 |
| C-3 | Below | .30 | 115 | 7.5 | 5 | .05 |
| A-4 | Above | .80 | 120 | 1 | 10 | .05 |
| B-4 | Surface | .67 | 120 | 1 | 10 | .05 |
| C-4 | Below | .53 | 120 | 1 | 10 | .05 |

Figure 2:
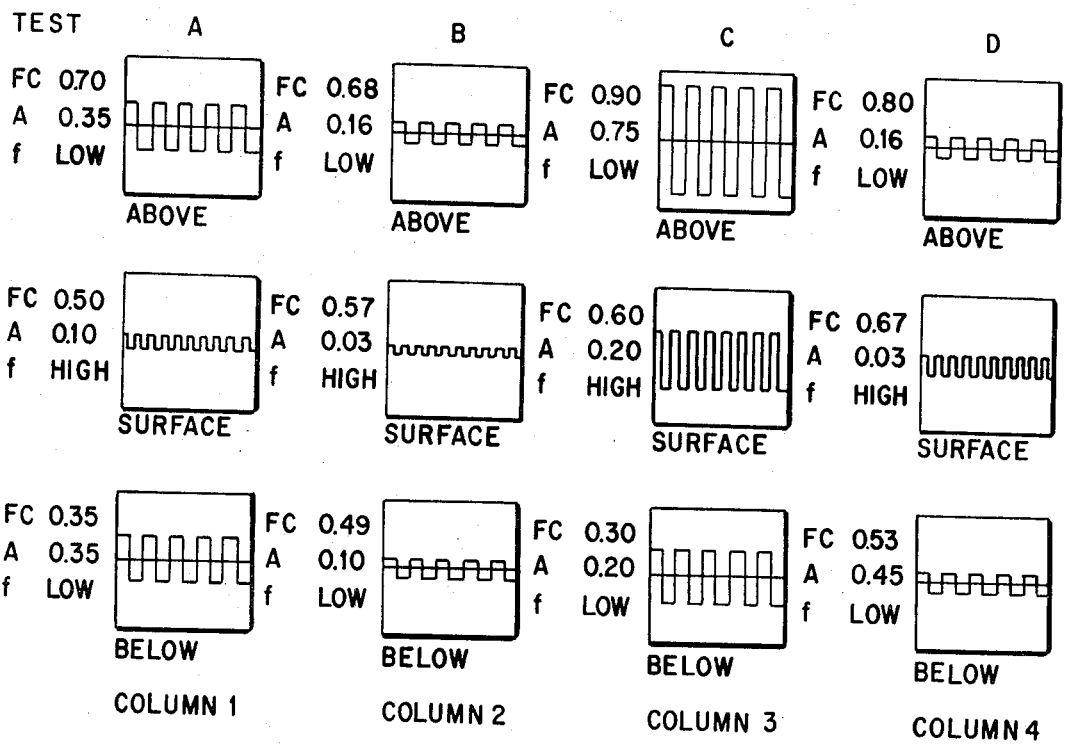
FIG. 2 is a graphic illustration showing various output signals from the transducer shown in FIG. 1.

FIG. 2 summarizes the results in schematic form with the use of square waves to simplify the drawings rather than the actual sinusoidal waves which are observed on the oscilloscope. The first set of experiments (A-1, B-1, and C-1) is designated as "Column 1," the second as "Column 2," etc.

As indicated in FIG. 2, in each set of experiments the operator made the necessary initial adjustments of focusing current to focus the beam above the surface of the workpiece, then on its surface, and finally below its surface. The oscilloscope trace obtained for each focusing condition was recorded. As shown, the voltage setting was altered intentionally for each of the four sets of experiments; likewise, the beam current was changed in the second and fourth sets of experiments.

As shown in FIG. 2, a distinctive output signal was obtained for the "in-focus" condition in all four sets of experiments. That is, in each case the "in-focus" signal had a significantly lower amplitude and a much higher frequency compared to the "focused-above surface" and the "focused-below surface" signals. This phenomenon makes it possible for the operator to readily optimize the focus by observing the oscilloscope trace and adjusting the focusing current until the distinctive waveforms (low amplitude, high frequency) is obtained.

The results displayed in FIG. 2 indicates that it is indeed possible to determine the degree of focus by monitoring the signal from the workpiece. Two major changes in the waveform are noticed when an in-focus condition is achieved. First, the amplitude of the signal is considerably reduced and second the frequency becomes much higher.

The signal from the transducer may be used in a number of ways to alert the operator. The cartridge output could be fed into a loudspeaker which would signal attainment of the focus by a change in pitch. Suitable standard circuitry could be provided to monitor the cartridge output during welding and to actuate an alarm if the output signal changes from the "in-focus" condition. Also, it is likely that automatic circuitry could be provided to maintain the beam focus very close to the optimum.

What is claimed is:

1. An electron beam focusing system for use in electron welding wherein a beam of electrons is directed onto an area of a workpiece being welded, comprising:
   means for mounting said workpiece in a position so as to isolate the workpiece from external vibration;
   a transducer having a pickup disposed against said workpiece at a position away from the area being welded for sensing vibrations generated by said electron beam striking said workpiece and an output whose signal is responsive to said vibrations; and
   means for monitoring the output of said transducer whereby said electron beam is focused on the workpiece according to a predetermined output signal from said transducer.

2. An electron beam focusing system as set forth in claim 1 wherein said transducer is an electro-mechanical transducer having an electrical signal output.

3. An electron beam focusing system as set forth in claim 2 wherein said means for monitoring the output of said transducer includes a preamplifier having an input connected to the output of said transducer and a frequency and amplitude responsive detector means having an input connected to the output of said preamplifier.

4. An electron beam focusing system as set forth in claim 3 wherein said frequency responsive detector means is an oscilloscope.

References Cited

UNITED STATES PATENTS

| 3,146,335 | 8/1964 | Samuelson | 219—121 |
| 3,152,238 | 10/1964 | Anderson | 219—121 |
| 3,158,733 | 11/1964 | Sibely | 219—117 |

JOSEPH V. TRUHE, Primary Examiner

R. E. O'NEILL, Assistant Examiner

U.S. Cl. X.R.

250—49.5